(12) United States Patent
Liu et al.

(10) Patent No.: US 11,868,299 B2
(45) Date of Patent: Jan. 9, 2024

(54) NETWORK-ON-CHIP DATA PROCESSING METHOD AND DEVICE

(71) Applicant: Shanghai Cambricon Information Technology Co., Ltd., Pudong New Area (CN)

(72) Inventors: Shaoli Liu, Pudong New Area (CN); Zhen Li, Pudong New Area (CN); Yao Zhang, Pudong New Area (CN)

(73) Assignee: SHANGHAI CAMBRICON INFORMATION TECHNOLOGY CO., LTD., Pudong New Area (CN)

( * ) Notice: Subject to any disclaimer, the term of this patent is extended or adjusted under 35 U.S.C. 154(b) by 0 days.

(21) Appl. No.: 17/564,529

(22) Filed: Dec. 29, 2021

(65) Prior Publication Data

US 2022/0121602 A1 Apr. 21, 2022

Related U.S. Application Data

(63) Continuation of application No. 17/278,812, filed as application No. PCT/CN2019/111977 on Oct. 18, 2019.

(30) Foreign Application Priority Data

Oct. 18, 2018 (CN) .......................... 201811215820.7
Oct. 18, 2018 (CN) .......................... 201811215978.4

(Continued)

(51) Int. Cl.
G06F 13/40 (2006.01)
G06N 3/04 (2023.01)

(52) U.S. Cl.
CPC .......... G06F 13/4068 (2013.01); G06N 3/04 (2013.01)

(58) Field of Classification Search
CPC .................................................. G06F 13/4068
See application file for complete search history.

(56) References Cited

U.S. PATENT DOCUMENTS

2009/0128571 A1   5/2009  Smith et al.
2012/0303848 A1   11/2012 Vallapaneni et al.
(Continued)

FOREIGN PATENT DOCUMENTS

CN   101227486 A   7/2008
CN   102075578 A   5/2011
(Continued)

OTHER PUBLICATIONS

EP 19873122.6—Extended European Search Report, dated May 20, 2022, 13 pages.

(Continued)

Primary Examiner — David E Martinez
(74) Attorney, Agent, or Firm — Getech Law LLC; Jun Ye

(57) ABSTRACT

The present application relates to a network-on-chip data processing method. The method is applied to a network-on-chip processing system, the network-on-chip processing system is used for executing machine learning calculation, and the network-on-chip processing system comprises a storage device and a calculation device. The method comprises: accessing the storage device in the network-on-chip processing system by means of a first calculation device in the network-on-chip processing system and obtaining first operation data; performing an operation on the first operation data by means of the first calculation device to obtain a first operation result; and sending the first operation result to a second calculation device in the network-on-chip process- (Continued)

ing system. According to the method, operation overhead can be reduced and data read/write efficiency can be improved.

17 Claims, 9 Drawing Sheets

(30) Foreign Application Priority Data

| | | | |
|---|---|---|---|
| Oct. 18, 2018 | (CN) | ......................... | 201811216718.9 |
| Oct. 18, 2018 | (CN) | ......................... | 201811216857.1 |
| Nov. 21, 2018 | (CN) | ......................... | 201811390409.3 |
| Nov. 21, 2018 | (CN) | ......................... | 201811390428.6 |
| Nov. 21, 2018 | (CN) | ......................... | 201811392232.0 |
| Nov. 21, 2018 | (CN) | ......................... | 201811392262.1 |
| Nov. 21, 2018 | (CN) | ......................... | 201811392270.6 |
| Nov. 21, 2018 | (CN) | ......................... | 201811392279.7 |
| Nov. 21, 2018 | (CN) | ......................... | 201811393352.2 |

(56) References Cited

U.S. PATENT DOCUMENTS

| | | |
|---|---|---|
| 2012/0303933 A1 | 11/2012 | Manet et al. |
| 2017/0083338 A1 | 3/2017 | Burger et al. |
| 2018/0004518 A1 | 1/2018 | Plotnikov et al. |

FOREIGN PATENT DOCUMENTS

| | | | |
|---|---|---|---|
| CN | 102591759 A | 7/2012 | |
| CN | 102868644 A | 1/2013 | |
| CN | 103218208 A | 7/2013 | |
| CN | 103580890 A | 2/2014 | |
| CN | 105183662 A | 12/2015 | |
| CN | 107316078 A | 11/2017 | |
| CN | 107578095 A | 1/2018 | |
| CN | 107920025 A | 4/2018 | |
| CN | 107992329 A | 5/2018 | |
| CN | 108427990 A | 8/2018 | |
| CN | 108431770 A | 8/2018 | |
| CN | 108470009 A | 8/2018 | |
| JP | H01179515 A | 7/1989 | |
| JP | H04507027 A | 12/1992 | |
| JP | 105274455 A | 10/1993 | |
| JP | H09120391 A | 5/1997 | |
| JP | 2738141 B2 | 4/1998 | |
| JP | 2001501755 A | 2/2001 | |
| JP | 2006286002 A | 10/2006 | |
| JP | 2008301109 A | 12/2008 | |
| JP | 2015509183 A | 3/2015 | |
| JP | 2018514872 A | 6/2018 | |
| KR | 100520807 B1 | 10/2005 | |
| KR | 1020100044278 A | 4/2010 | |
| KR | 1020100125331 A | 11/2010 | |
| KR | 101306354 B1 | 9/2013 | |
| KR | 1020160127100 A | 11/2016 | |
| KR | 1020170125396 A | 11/2017 | |
| WO | 2015087424 A1 | 6/2015 | |
| WO | 2017185418 A1 | 11/2017 | |
| WO | 2018103736 A1 | 6/2018 | |
| WO | WO-2018103736 A1 * | 6/2018 | ......... G06F 13/1678 |
| WO | 2018126073 A1 | 7/2018 | |

OTHER PUBLICATIONS

EP 21217802.4—Extended European Search Report, dated May 3, 2022, 11 pages.
EP 21217809.9—Extended European Search Report, dated May 10, 2022, 11 pages.
EP 21217811.5—Extended European Search Report, dated May 9, 2022, 11 pages.
KR 10-2020-7034133—Notification of Reason for Refusal, dated Jul. 14, 2022, 11 pages.
KR 10-2020-7034126—Office Action, dated Jul. 25, 2022, 13 pages.
KR 10-2020-7034138—Office Action, dated Jul. 19, 2022, 15 pages.
KR 10-2020-7034145—Office Action, dated Jul. 25, 2022, 7 pages.
CN 201811215820.7—First Office Action, dated Aug. 26, 2021, 31 pages. (with English translation).
CN 201811215978.4—First Office Action, dated Aug. 26, 2021, 32 pages. (with English translation).
CN 201811216718.9—First Office Action, dated Aug. 26, 2021, 21 pages. (with English translation).
CN 201811390409.—First Office Action, dated Feb. 20, 2021, 10 pages. (with English translation).
CN 201811392232.0—First Office Action, dated Feb. 10, 2021, 11 pages. (with English translation).
CN 201811392270.6—First Office Action, dated Aug. 18, 2021, 12 pages. (with English translation).
JP 2020206272—Notice of Reasons for Refusal, dated Nov. 24, 2021, 7 pages. (with English translation).
JP 2020206281—Notice of Reasons for Refusal, dated Dec. 9, 2021, 8 pages. (with English translation).
JP 2020206293—Notice of Reasons for Refusal, dated Dec. 9, 2021, 8 pages. (with English translation).
JP 2020206306—Notice of Reasons for Refusal, dated Dec. 9, 2021, 8 pages. (with English translation).
JP 2020569113—Notice of Reasons for Refusal, dated Nov. 24, 2021, 7 pages. (with English translation).
CN201811216857.1—Second Office Action dated Jun. 1, 2023, 19 pages (With Brief English Explanation).
KR20207034126—Written Decision on Registration dated May 8, 2023, 6 pages.
KR20207034133—Written Decision on Registration dated May 8, 2023, 6 pages.
KR20207034138—Written Decision on Registration dated May 8, 2023, 6 pages.
KR20207034145—Written Decision on Registration dated May 8, 2023, 6 pages.
CN201811216857.1—Chinese Office Action dated Jan. 3, 2023, 22 pages. (With Brief English Explanation).
Ebrahimi et al., "Cluster-based topologies for 3D Networks-on-Chip using advanced inter-layer bus architecture", Journal of Computer and System Sciences, vol. 79, Issue 4, Jun. 2013, pp. 475-491.
PCT /CN2019/111977—International Search Report and Written Opinion dated Jan. 22, 2020, 13 pages.

* cited by examiner

NETWORK-ON-CHIP DATA PROCESSING METHOD AND DEVICE

CROSS REFERENCES

This application is a continuation of U.S. patent application Ser. No. 17/278,812, filed Mar. 23, 2021, which is a 371 of International Application PCT/CN2019/111977, filed Oct. 18, 2019, which claims the benefit of priority from Chinese Application No. 201811216718.9 with the title of "Network-On-Chip Processing System and Network-On-Chip Data Processing Method", Chinese Application No. 201811215820.7 with the title of "Network-On-Chip Processing System and Network-On-Chip Data Processing Method", Chinese Application No. 201811215978.4 with the title of "Network-on-Chip Processing System and Network-on-Chip Data Processing Method", and Chinese Application No. 201811216857.1 with the title of "Network-on-Chip Data Processing Method, Storage Medium, Computer Equipment and Device", all of which were filed on Oct. 18, 2018; this application also claims the benefit of priority from Chinese Application No. 201811392232.0 with the title of "Data Processing Method, Device, and Related Product", Chinese Application No. 201811392262.1 with the title of "Data Processing Method, Device, and Related Product", Chinese Application No. 201811392279.7 with the title of "Data Processing Device, Method, and Related Product", Chinese Application No. 201811393352.2 with the title of "Data Processing Device, Method, and Related Product", Chinese Application No. 201811390409.3 with the title of "Data Processing Device, Method, and Related Product", Chinese Application No. 201811390428.6 with the title of "Data Processing Device and Related Product", and Chinese Application No. 201811392270.6 with the title of "Data Processing Device and Related Product", all of which were filed on Nov. 21, 2018. The disclosures of the above applications are incorporated herein by reference in their entirety.

TECHNICAL FIELD

The present disclosure relates to the field of information processing technology, and particularly relates to a network-on-chip data processing method and device.

BACKGROUND

With the development of semi-conductor technology, it has become a reality to integrate hundreds of millions of transistors on a single chip. The network-on-chip (NoC) is capable of integrating plenty of computation resources on a single chip and implementing on-chip communication.

As plenty of computations are required in a neural network, some of the computations, such as a forward operation, a backward operation, and weight update, need to be processed in parallel. In a chip architecture with a large number of transistors, chip design may face problems such as high memory access overhead, high bandwidth blockage, and low data reading/writing efficiency.

SUMMARY

In order to at least overcome the problems existing in the related technology to a certain extent, the present disclosure provides an interaction method, a device, and a smart terminal.

An embodiment of the present disclosure provides a network-on-chip (NoC) processing system. The system includes: a storage device and a plurality of computation devices, where the storage device and the plurality of computation devices are arranged on a same chip. At least one computation device is connected to the storage device, and at least two computation devices are connected to each other.

In an embodiment, any two of the plurality of computation devices are directly connected to each other.

In an embodiment, the plurality of computation devices include a first computation device and a plurality of second computation devices, where the first computation device is connected to the storage device, and at least one of the plurality of second computation devices is connected to the first computation device.

In an embodiment, at least two of the plurality of second computation devices are connected to each other, and are connected to the storage device through the first computation device.

In an embodiment, any two of the plurality of second computation devices are directly connected to the first computation device.

In an embodiment, each of the plurality of computation devices is connected to the storage device, and at least two computation devices are connected to each other.

An embodiment of the present disclosure provides a data processing device for processing machine learning data. The data processing device includes: a machine learning device, a transmission circuit, and a shared memory, where the machine learning device is connected to the transmission circuit, and the transmission circuit is connected to the shared memory;

the transmission circuit is configured to obtain input data required by the machine learning device from the shared memory according to the data operation signal sent by the machine learning device, and return the input data to the machine learning device. The data operation signal carries a type flag bit of a data operation signal and information of data to be operated.

In an embodiment, the machine learning device is configured to perform a machine learning operation according to the input data to obtain output data.

In an embodiment, the machine learning device is further configured to transfer the output data to the shared memory through the transmission circuit for data storage.

In an embodiment, the machine learning device includes at least one machine learning unit;
the data operation signal further includes a data reception flag bit which is used to indicate a target machine learning unit that receives the input data.

In an embodiment, the value of the type flag bit of the data operation signal includes CAST, which indicates that the data operation signal is a broadcast or multicast instruction.

In an embodiment, the type flag bit of the data operation signal includes a first-type flag bit and a second-type flag bit, where a value of the first-type flag bit includes I/O, which indicates whether the data operation signal is an I/O instruction; and the second-type flag bit is used to indicate whether the data operation signal is a broadcast or multicast instruction in the I/O instruction.

In an embodiment, the information of the data to be operated includes at least one of a source address of the data to be operated in the shared memory, a length of the data to be operated, and a data return address after the data is operated.

In an embodiment, the data operation signal further includes jump information, where the jump information includes a jump stride and a data length operated after each jump.

In an embodiment, the jump information includes stride jump information and/or segment jump information, where
- the stride jump information is used to indicate a stride for each jump of the data operation signal; and
- the segment jump information is used to indicate a preset size for each segment of the data operation signal.

In an embodiment, the data operation signal further includes a function flag bit which is used to indicate a processing operation performed by the transmission circuit on read data.

An embodiment of the present disclosure further provides a data processing method which is applied to the above data processing device, where the method includes:
- receiving, by a transmission circuit in the data processing device, a data operation signal sent by a machine learning device in the data processing device, where the data operation signal carries a type flag of the data operation signal and information of data to be operated;
- determining, by the transmission circuit, an operation performed on data in a shared memory according to the type flag bit of the data operation signal; performing, by the transmission circuit, the operation on the data to be operated according to the information of the data to be operated to obtain input data required by the machine learning device; and returning, by the transmission circuit, the input data to the machine learning device; and
- performing, by the machine learning device, a machine learning operation according to the input data to obtain output data; using the output data as new input data, and transferring the new input data to the shared memory through the transmission circuit for data storage.

In an embodiment, the machine learning device includes at least one machine learning unit, and the data operation signal further includes a data reception flag bit. The returning the input data to the machine learning device includes:
- determining, by the transmission circuit, a target machine learning unit that receives the input data according to the value of the data reception flag bit, and sending the input data to the target machine learning unit.

In an embodiment, the information of the data to be operated includes a source address of the data to be operated in the shared memory, a length of the data to be operated, and a data return address after the data is operated; the step of performing the operation on the data to be operated according to the information of the data to be operated to obtain input data required by the machine learning device and returning the input data to the machine learning device includes:
- reading, by the transmission circuit, the shared memory from the source address; and obtaining the input data that satisfies the data length; and
- returning, by the transmission circuit, the input data to the target machine learning unit according to the data return address and the data reception flag bit.

In an embodiment, the input data includes input neuron data and/or weight data; and the output data includes output neuron data.

An embodiment of the present disclosure provides a neural network operation device, where the operation device includes one or more computation devices in the Noc processing system. The neural network operation device is configured to obtain data to be operated and control information from other processing devices, execute a specified machine learning operation, and transfer an execution result to other processing devices through an I/O interface.

When the neural network operation device includes a plurality of the computation devices, the plurality of computation devices may be interconnected and transfer data to each other through a specific structure, where
- the plurality of computation devices are interconnected and transfer data to each other through a PCIE bus to support a larger-scale machine learning operation; the plurality of computation devices share a same control system or have respective control systems; the plurality of computation devices share a memory or have respective memories; and an interconnection mode of the plurality of computation devices is any interconnection topology.

An embodiment of the present disclosure provides a combined processing device, where the combined processing device includes the neural network operation device, a universal interconnection interface, and other processing devices. The neural network operation device interacts with the other processing devices to jointly complete operations specified by a user. The combined processing device may also include a storage device, where the storage device is connected to the neural network operation device and the other processing devices respectively, and the storage device is configured to store data of the neural network computation device and the other processing devices.

An embodiment of the present disclosure provides a neural network chip, where the chip includes the computation device in the NoC processing system, the neural network computation device, or the combined processing device.

An embodiment of the present disclosure provides a neural network chip package structure, where the package structure includes the neural network chip.

An embodiment of the present disclosure provides a board card, where the board card includes the neural network chip package structure.

An embodiment of the present disclosure provides an electronic device, where the electronic device includes the neural network chip or the board card.

It should be understood that the above general descriptions and the following detailed descriptions are only exemplary and illustrative, and are not intended to limit the present disclosure.

BRIEF DESCRIPTION OF THE DRAWINGS

The accompanied drawings herein are incorporated into the specification and constitute a part of the specification, illustrate embodiments that conform to the present disclosure, and are used together with the specification to explain principles of the present disclosure.

DETAILED DESCRIPTION OF THE EMBODIMENTS

The exemplary embodiments will be described in detail, and examples thereof are shown in the accompanied drawings. Unless otherwise indicated, identical numbers in different drawings indicate identical or similar elements. The implementation manners described in the following exemplary embodiments do not represent all implementation manners consistent with the present disclosure. On the contrary, the implementation manners are only examples of devices and methods which are consistent with some aspects of the present disclosure and specifically described in the appended claims.

With the continuous development of information technology, the demand for data access and data processing becomes higher, which leads to higher requirements for processors that process data and access data. For example, for a general-purpose processor, a multi-core processor composed of a plurality of general-purpose processor cores (such as CPU cores) has become a mainstream thanks to its powerful parallel computation capabilities.

However, with continuous development of artificial neural networks, machine learning chips with more architectures gradually come out. These machine learning chips need to access data or process data in the shared storage according to instructions during operation. When there is a large amount of data involved in data access or in the shared storage, instructions of the machine learning chips gradually become complicated, which affects the speed of reading the shared storage through instructions and thus results in low efficiency of neuron data processing.

Therefore, how to improve accelerate access speed of a machine learning chip during data access has become an urgent technical problem to be solved by current technicians.

To solve the above problem, the present disclosure provides the following technical solutions.

Figure 1:
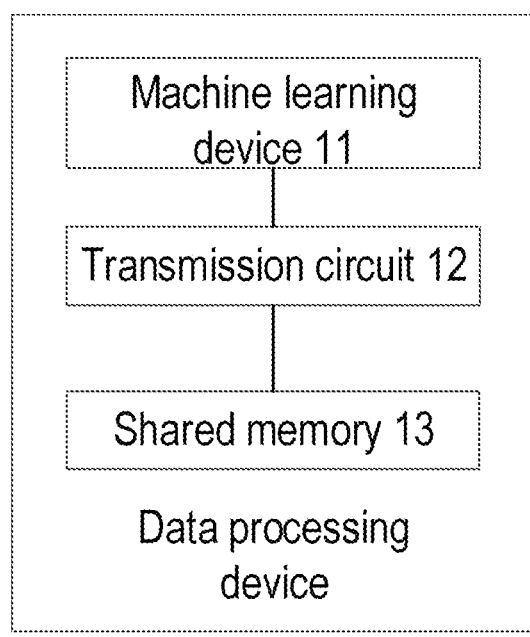
FIG. 1 is a diagram of application environment of a data processing method according to an embodiment.

The data processing method provided in the present disclosure may be applied to the hardware circuit shown in FIG. 1. The circuit includes: a machine learning device 11, a transmission circuit 12, and a shared memory 13, where the machine learning device 11 and the transmission circuit 12 are connected through an interface, and the transmission circuit 12 and the shared memory 13 are connected through an interface. The machine learning device 11, the transmission circuit 12, the shared memory 13 and the interfaces may all be implemented by a hardware circuit. For example, the machine learning device may be a device with arithmetic function formed by a plurality of machine learning units (MLU), the transmission circuit may be a broadcast bus, and the shared memory may be a non-volatile and/or volatile memory, including but not limited to a random access memory (RAM), a scratchpad memory, and the like. The form of the above hardware is not limited in the present disclosure. The transmission circuit 12 is configured to obtain input data required by the machine learning device 11 from the shared memory 13 according to a data operation signal sent by the machine learning device 11, and return the input data to the machine learning device 11. The machine learning device 11 is configured to perform a machine learning operation according to the input data to obtain output data, use the output data as new input data, and transfer the data to the shared memory 13 for data storage through the transmission circuit 12.

In an embodiment, as shown in FIG. 1, a data processing device provided in an embodiment of the present application may be part or all of the data processing device shown in FIG. 1, which may be implemented by software, hardware, or a combination of software and hardware. The data processing device 10 is configured to perform machine learning data processing. The data processing device 10 includes: a machine learning device 11, a transmission circuit 12, and a shared memory 13. The machine learning device 11 is connected to the transmission circuit 12, and the transmission circuit 12 is connected to a shared memory 13; the transmission circuit 12 is configured to obtain input data required by the machine learning device 11 from the shared memory 13 according to the data operation signal sent by the machine learning device 11, and return the input data to the machine learning device 11; and the data operation signal carries a type flag bit of a data operation signal and information of data to be operated. Optionally, the machine learning device 11 is configured to perform a machine learning operation according to the input data to obtain output neuron data, use the output neuron data as new input neuron data, and transfer the new input data to the shared memory 13 through the transmission circuit 12 for data storage.

It should be noted that the above machine learning device, the transmission circuit, and the shared memory may all be implemented by hardware circuits. For example, the machine learning device may be a device with arithmetic function formed by a plurality of machine learning units (MLU), the transmission circuit may be a broadcast bus, and the shared memory may be a non-volatile and/or volatile memory, including but not limited to a random access memory (RAM), a scratchpad memory, and the like. The above machine learning device, the transmission circuit, and the shared memory perform data transfer among each other through an interface. For example, the machine learning device may send data operation signals through the interface, or may send or receive data through the interface. Correspondingly, the interface may be either a sending interface or a receiving interface. In other words, when the interface is a sending interface, the machine learning device may send data operation signals or data to the transmission circuit; when the interface is a receiving interface, the machine learning device may receive data operation signals or data sent by the transmission circuit. The interface may be various types of interfaces, where the various types of interfaces may all be implemented by means of hardware circuits. Specific hardware forms of the various types of interfaces are not limited in the embodiment, as long as data signal interaction among a machine learning device, a transmission circuit, and a shared memory can be implemented through the interface. The input data is data that the machine learning device needs to input when performing a machine learning operation, and, for example, may be input neuron data and weight data. The above data may be data pre-stored in the shared memory, or may be data output by the machine learning device after the machine learning operation is executed. Optionally, the machine learning device may be directly connected to the shared memory through a plurality of data I/O interfaces or I/O pins to obtain the above data. Optionally, the machine learning device may also be connected to the transmission circuit through a plurality of data I/O interfaces or I/O pins, and then be connected to the shared memory through the transmission circuit to obtain the above data.

The data operation signal may indicate that the transmission circuit performs a read or write operation on the data in the shared memory. When the data operation signal sent by the machine learning device is a read operation, the transmission circuit may find data in a corresponding address from the shared memory, read the data, and then return the data to the machine learning device that sends the data operation signal; when the data operation signal sent by the machine learning device is a write operation, the transmission circuit may write the write data output by the machine learning device into the shared memory. An data operation signal carries a type flag bit of the data operation signal and information of data to be operated, where the type flag bit of the data operation signal indicates a type of the data operation signal. For example, if the type flag bit of the data operation signal is CAST, it is indicated that the data operation signal is a broadcast or multicast instruction. The information of the data to be operated indicates data required by the transmission circuit when the transmission circuit performs a corresponding operation according to the data operation signal. A specific form of the type flag bit of the data operation signal and specific data information in the information of the data to be operated are not limited herein and may be determined according to actual situations.

It should be noted that the data processing device provided in the present disclosure is applied to a machine learning operation, where the machine learning operation includes a neural network operation, a k-means operation, a support vector machine operation, and the like. For example, an operation performed by a machine learning device in a neural network may be an operation of one layer of the neural network. For a multi-layer neural network, an implementation of the operation may be that, in a forward operation, after the operation of a previous layer of an artificial neural network is completed, an operation instruction of a next layer is performed by using an output neuron obtained by an operation unit as an input neuron of the next layer for operation (or some operations are performed on the output neuron before the output neuron serves as the input neuron of the next layer), and at the same time, a weight is replaced with a weight of the next layer; in a backward operation, after the back operation of a previous layer of the artificial neural network is completed, an operation instruction of a next layer is performed by using an input neuron gradient obtained by an operation unit as an output neuron gradient of the next layer (or as output neuron data) for operation (or some operations are performed on the input neuron gradient before the input neuron gradient serves as the output neuron gradient of the next layer), and at the same time, a weight is replaced with a weight of the next layer. Optionally, the neural network in the embodiment of the present disclosure may not only be an artificial neural network, but also a spiking neural network, which is not limited in this embodiment. The machine learning device provided in this embodiment may perform a machine learning operation according to input data. For example, in a machine learning operation, for a multi-layer neural network, a machine learning device may compute neuron data output by each layer of neural network, and perform an operation set including a series of machine learning operations such as a product operation, a sum operation, and a function operation on a plurality of input data corresponding to an input of each layer of neural network. The machine learning device obtains output neuron data of a current layer through the machine learning operation. The output neuron data may be used as input neuron data of a next layer of neural network for another machine learning operation, before which the output neuron data of the current layer may be written into the shared memory through the transmission circuit for storage, so that the machine learning device may read the data at any time for the machine learning operation.

Specifically, in actual applications, the transmission circuit is configured to obtain input data required by the machine learning device from the shared memory according to a data operation signal sent by the machine learning device, and return the input data to the machine learning device; then the machine learning device is configured to perform a machine learning operation according to the input data to obtain output data, use the output data as new input data, and transfer the data to the shared memory for data storage through the transmission circuit. In this embodiment, since the data operation signal carries a type flag bit of the data operation signal and the information of the data to be operated, the transmission circuit may determine a specific type of the data operation signal according to the type flag bit of the data operation signal after receiving the data operation signal, and then perform an operation according to the information of the data to be operated carried in the data operation signal. In this way, classification of the type flag bits of the data operation signal may quickly locate a corresponding operation, which may simplify the data access logic, improve the data access efficiency, and greatly improve the access speed of the machine learning chip during data access.

Figure 2:
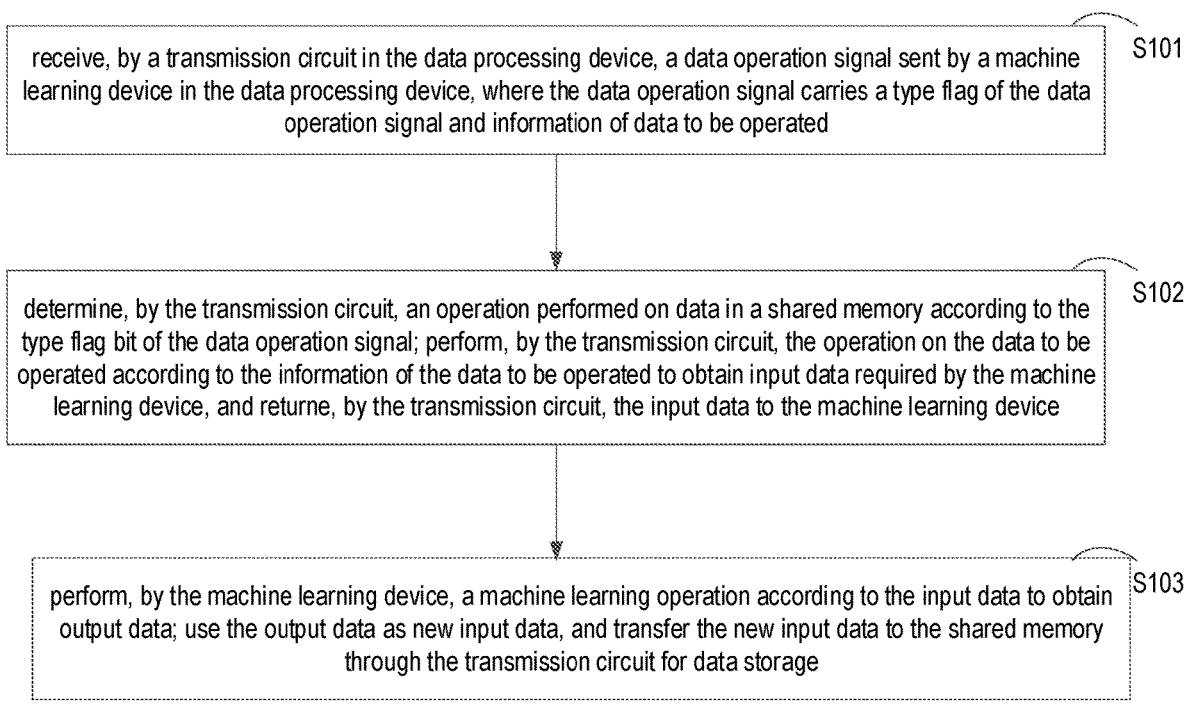
FIG. 2 is a flowchart of a data processing method according to an embodiment.

In an embodiment, as shown in FIG. 2, in a data processing device provided in the present disclosure, the machine learning device 11 includes at least one machine learning unit 14, and the data operation signal further includes a data reception flag bit used to indicate a target machine learning unit that receives the input data.

Data signal operations performed by the at least one machine learning unit (MLU) included in the machine learning device may share a same data receiving interface. The machine learning unit may be connected to the transmission circuit through a sending interface and a shared data receiving interface. It should be noted that both the sending interface and the shared data receiving interface may be implemented by hardware circuits, and types of the sending interface and the shared data receiving interface are not limited herein. The data operation signal further includes a data reception flag bit which is used to indicate a target machine learning unit that receives input data. A flagging manner of the data reception flag bit may be, for example, flagging a target machine learning unit that can receive input data as 1, and correspondingly, flagging the target machine learning unit that cannot receive input data as 0. It should be understood that it is only one manner to flag a target machine learning unit that can receive data as 1. In practical applications, the target machine learning unit that can receive data may also be flagged as 0 and the target machine learning unit that cannot receive data may be flagged as 1. A specific flagging manner of the data reception flag bit is not limited herein.

In this embodiment, according to the flagging of the data reception flag bit carried in the data operation signal, the target machine learning unit that can receive the input data in the machine learning device may be determined. In this way, when receiving data, each machine learning unit in the machine learning device is determined according to the data reception flag bit in the data operation signal, which may simplify the memory access logic in the data access process, improve the data access efficiency, and greatly improve the access speed of the machine learning chip during data access.

Several embodiments are used to respectively introduce relationships among the type flag bit of the data operation signal, information of data to be operated, and the data reception flag bit.

In an embodiment, a value of a type flag bit of the data operation signal includes CAST, which indicates that the data operation signal is a broadcast or multicast instruction. Optionally, the information of data to be operated includes a source address of the data to be operated in the shared memory, a length of the data to be operated, and a data return address after the data is operated.

In this embodiment, a type flag bit of a data operation signal is used to indicate an operation type of the data operation signal. For example, as shown in Table 1 below, if the type flag bit of the data operation signal is CAST, it is indicated that the data operation signal is a broadcast or multicast instruction; information of data to be operated includes a source address 0x110011, a destination address 0x000100, and a data length 0x0100. The data length is a length set by the user. The user may set the length to a value or a plurality of values, and a specific value and a count of the set length are not limited herein. In the data reception flag bit, three MLUs are flagged as 1, which means that the three MLUs can receive data; and one MLU is flagged as 0, which means that the MLU cannot receive data. Specifically, the transmission circuit reads data with a length of 0x0100 from the address 0x110011 in the shared memory according to the data operation signal, and then writes the data to the address 0x000100 of MLU3, MLU1, and MLU0 in the machine learning device.

TABLE 1

| Type flag bit | Operation information | | | | Data information | | |
| --- | --- | --- | --- | --- | --- | --- | --- |
| | Flag whether MLU receives data | | | | Source address | Target address | Data length |
| CAST | MLU3 | MLU2 | MLU1 | MLU0 | | | |
| CAST | 1 | 0 | 1 | 1 | 0x110011 | 0x000100 | 0x0100 |

In another embodiment, the type flag bit of the data operation signal includes a first-type flag bit and a second-type flag bit. Optionally, if a value of the first-type flag bit includes I/O, the data operation signal is determined to be an I/O instruction; and the second-type flag bit is used to indicate the data operation signal is a broadcast or multicast instruction in the I/O instruction.

In this embodiment, the data operation signal includes two types of data flag bits, where the first-type data flag bit indicates a type of the data operation signal, the second-type data flag bit is set in operation information of the data operation signal and indicates a specific sub-type of the data operation signal. The data reception flag bit is the same as in the above embodiment and indicates a target machine learning unit that can receive input data. Optionally, as shown in the following Table 2, if a value of the first-type data flag bit is I/O, the data operation signal is determined to be an I/O instruction; if a value of the second-type data flag bit is 1, the data operation signal is determined to be a broadcast or multicast instruction in the I/O instruction. Correspondingly, if a value of the second-type data flag bit is 0, the data operation signal is determined not to be a broadcast or multicast instruction. The information of data to be operated includes a source address 0x110011, a destination address 0x000100, and a data length 0x0100. The data length is a length set by the user. The user may set the length to a value or a plurality of values, which is not limited herein. In the data reception flag bit, three MLUs are flagged as 1, which means that the three MLUs can receive data; and one MLU is flagged as 0, which means that the MLU cannot receive data. Specifically, the transmission circuit reads data with a length of 0x0100 from the address 0x110011 in the shared memory according to the data operation signal, and then writes the data to the address 0x000100 of MLU3, MLU1, and MLU0 in the machine learning device.

TABLE 2

| | | Operation information | | | | | | |
|---|---|---|---|---|---|---|---|---|
| | Whether it is a broadcast/ | | Flag whether MLU receives data | | | | Data information | |
| Type flag bit | multicast | | | | | | | |
| I/O | instruction | MLU3 | MLU2 | MLU1 | MLU0 | Source address | Target address | Data length |
| I/O | 1 | 1 | 0 | 1 | 1 | 0x110011 | 0x000100 | 0x0100 |

In another embodiment, on the basis of the above Table 1 or Table 2, the data operation signal further includes jump information, where the jump information includes a jump stride and a data length operated after each jump. Optionally, the jump information includes stride jump information and/or segment jump information.

In this embodiment, the jump information included in the data operation signal is used to instruct the transmission circuit to read the information of data to be operated according to the data operation signal and a rule of the jump information. A specific reading method includes: reading, by the transmission circuit, data in the shared memory from a source address in the information of data to be operated, determining read data with a jump data length as first jump data after a current jump, then obtaining a last address of the first jump data, and according to a jump stride in the jump information, starting jumping data with a length of the jump stride from the last address of the first jump data to a target jump address. It can be understood that a length between the last address of the first jump data and the target jump address is a jump stride in the jump information. Then the transmission circuit starts jumping data with a preset length from the target jump address and determines data obtained after the jump as second jump data. If the length between an address of the second jump data and the source address where the jump starts satisfies a length of data required by the machine learning device, it is indicated that reading the data required by the machine learning device is completed. If the length between an address of the second jump data and the source address where the jump starts does not satisfy a length of data required by the machine learning device, the transmission circuit continues to jump from the last address of the second jump data according to the jump order to read the data until the length between the address of the second jump data and the source address where the jump starts satisfies the length of the data required by the machine learning device, it is indicated that the reading the data required by the machine learning device is completed.

Generally, the data processing device provided in the embodiment needs to parse a data operation signal before performing read/write processing on the data operation signal. Optionally, the transmission circuit includes: an instruction storage unit configured to store the data operation signal, an instruction processing unit configured to parse the data operation signal to obtain a type flag bit of the data operation signal and information of data to be operated, a storage queue unit configured to store an instruction queue, where the instruction queue includes a plurality of the data operation signals to be executed in an order of the instruction queue. Generally, a large amount of data operation signals are involved in the process of data processing. When one of the data operation signals is processed, the others need to be stored in the instruction storage unit. The instruction processing unit is configured to, in a process of parsing the data operation signal, parse data information carried in the data operation signal. In addition, since a process of the data operation signal valuing, decoding, and transmission is completed in a pipeline form, all the data operation signals need to complete the above process in order, and the instruction queue is stored by the storage queue unit.

In addition, since the instruction processing unit processes data operation signals in the queue one by one, it is necessary to ensure that a currently processed data operation signal is associated to a next data operation signal. Optionally, the transmission circuit further includes: a dependency processing unit configured to determine whether there is an association between an $s^{th}$ data operation signal and an $s-1^{th}$ data operation signal before the $s^{th}$ data operation signal. If there is an association relationship between the $s^{th}$ data operation signal and the $s-1^{th}$ data operation signal, the dependency processing unit is configured to cache the $s^{th}$ data operation signal in the instruction storage unit, and after the $s-1^{th}$ data operation signal is executed, fetch the $s^{th}$ data operation signal from the instruction storage unit and transfer the data to the instruction processing unit. The determining whether there is a association between the $s^{th}$ data operation signals and the $s-1^{th}$ data operation signal includes: fetching a first storage address interval of data required in the $s^{th}$ data operation signal according to the $s^{th}$ data operation signal, fetching a zeroth storage address interval of data required in the $s-1^{th}$ data operation signal according to the $s-1^{th}$ data operation signal, respectively; if the first storage address interval and the zeroth storage address interval have an overlapping area, it is determined that there is an association between the $s^{th}$ data operation signal and the $s-1^{th}$ data operation signal; and if the first storage address interval and the zeroth storage address interval do not have an overlapping area, it is determined that there is no association between the $s^{th}$ data operation signal and the $s-1^{th}$ data operation signal.

In this embodiment, before the data operation device performs an operation according to the data processing signal, the device stores unused data processing signals in order, and parses and decodes the unused data operation signals in turn during use. During the parsing and decoding process, the device ensures continuity of the data operation signal by determining an association between two adjacent data operation signals. In this way, orderly preparations in the early stage ensure subsequent operations to be executed smoothly according to the data operation signal, which improves the data access efficiency and greatly improve the access speed of the machine learning chip during data access.

An embodiment of the present disclosure provides a data processing method, where the method may be applied to the hardware circuit shown in FIG. 1. The circuit includes: a machine learning device 11, a transmission circuit 12, and a shared memory 13, where the machine learning device 11 is connected to the transmission circuit 12 through an interface, the transmission circuit 12 is connected to the shared memory 13 through an interface. The interfaces may be implemented by hardware circuits. Specific hardware forms of the interface are not limited herein. The transmission circuit 12 is configured to obtain input data required by the machine learning device 11 from the shared memory 13 according to a data operation signal sent by the machine learning device 11, and return the input data to the machine learning device 11. The machine learning device 11 is configured to perform a machine learning operation according to the input data to obtain output neuron data, use the output neuron data as new input neuron data, and transfer the data to the shared memory 13 for data storage through the transmission circuit 12.

In order to make the purposes, technical schemes, and technical effects of the present disclosure clearer, the present disclosure will be described hereinafter with reference to the accompanied drawings and embodiments. It should be understood that the embodiments described here are merely used for explaining the present disclosure, rather than limiting the present disclosure. The data processing method provided in the embodiment of the present disclosure aims to solve a technical problem of how to improve access speed of a machine learning chip in data access when there is a large amount of data involved in data access or shared storage. The technical solutions of the present disclosure and how the technical solutions solve the above technical problems will be described in detail hereinafter with reference to the embodiments and the accompanied drawings. The following specific embodiments may be combined with each other, and identical or similar concepts or processes may not be further described in some embodiments. It should be noted that an executive body of the data processing method provided in the present disclosure is a transmission circuit and may also be a data processing device, where the device may be implemented by software, hardware, or a combination of software and hardware to be part or all of a data analysis terminal.

In an embodiment, FIG. 2 provides a data processing method. This embodiment describes a process of the transmission circuit determining a type of the data operation signal according to a type flag bit of the data operation signal to locate a corresponding operation, and obtaining data required by the machine learning device from the shared memory according to the corresponding operation to improve the access speed. The method shown in FIG. 2 includes:

a step S101, receiving, by a transmission circuit in the data processing device, a data operation signal sent by a machine learning device in the data processing device, where the data operation signal carries a type flag of the data operation signal and information of data to be operated.

The machine learning device may be a device with arithmetic function formed by a plurality of MLUs. The transmission circuit may be a broadcast bus, and the shared memory may be a non-volatile and/or volatile memory, including but not limited to a random access memory (RAM), a scratchpad memory, and the like. In this embodiment, a transmission circuit in the data processing device receives a data operation signal sent by a machine learning device in the data processing device, where the data operation signal carries a type flag of the data operation signal and information of data to be operated. The data operation signal may be transmitted between the transmission circuit and the machine learning device through an interface. The transmission circuit may determine a type of the data operation signal and data information required in the operation according to a type flag bit of the data operation signal and data information to be operated carried by the data operation signal.

The method further includes a step S102, determining, by the transmission circuit, an operation performed on data in a shared memory according to the type flag bit of the data operation signal; performing, by the transmission circuit, the operation on the data to be operated according to the information of the data to be operated to obtain input data required by the machine learning device, and returning, by the transmission circuit, the input data to the machine learning device.

Based on the data operation signal sent from the machine learning device to the transmission circuit in the step S101, the transmission circuit determines an operation to be performed on data in a shared memory according to the type flag bit of the data operation signal, determines data in the shared memory (data to be operated) on which the operation needs to be performed according to the information of the data to be operated to obtain input data required by the machine learning device, and returns the input data to the machine learning device. The input data is data that the machine learning device needs to input when performing a machine learning operation. The above data may be data pre-stored in the shared memory, or may be data output by the machine learning device after the machine learning operation is executed.

The method further includes a step S103, performing, by the machine learning device, a machine learning operation according to the input data to obtain output data; using the output data as new input data, and transferring the new input data to the shared memory through the transmission circuit for data storage.

In the step, the machine learning device performs a machine learning operation according to the input data sent by the transmission circuit in the step S102 to obtain output data, uses the output data as new input data, and transfers the new input data to the shared memory through the transmission circuit for data storage. For example, if a machine learning device performs a neural network operation, the neural network operation may be an operation of one layer of the neural network. For a multi-layer neural network, an implementation of the operation may be that, in a forward operation, after the operation of a previous layer of an artificial neural network is completed, an operation instruction of a next layer is performed by using an output neuron obtained by an operation unit as an input neuron of the next layer for operation (or some operations are performed on the output neuron before the output neuron serves as the input neuron of the next layer), and at the same time, a weight is replaced with a weight of the next layer; in a backward operation, after the back operation of a previous layer of the artificial neural network is completed, an operation instruction of a next layer is performed by using an input neuron gradient obtained by an operation unit as an output neuron gradient of the next layer (or as output neuron data) for operation (or some operations are performed on the input neuron gradient before the input neuron gradient serves as the output neuron gradient of the next layer), and at the same time, a weight is replaced with a weight of the next layer. Optionally, the neural network in the embodiment of the present disclosure may not only be an artificial neural network, but also a spiking neural network, which is not limited in this embodiment. The machine learning device provided in this embodiment may perform a machine learning operation according to input data. For example, in a machine learning operation, for a multi-layer neural network, a machine learning device may compute neuron data output by each layer of neural network, and perform an operation set including a series of machine learning operations such as a product operation, a sum operation, and a function operation on a plurality of input data corresponding to an input of each layer of neural network. The machine learning device obtains output neuron data of a current layer through the machine learning operation. The output neuron data may be used as input neuron data of a next layer of neural network for another machine learning operation, before which the output neuron data of the current layer may be written into the shared memory through the transmission circuit for storage, so that the machine learning device may read the data at any time for the machine learning operation.

In a data processing method provided in an embodiment, a transmission circuit is configured to obtain input data required by a machine learning device interface from a shared memory according to a data operation signal which carries a type flag bit of the data operation signal and information of data to be operated and is sent by the machine learning device through a sending interface, and return the input data to the machine learning device through a receiving interface. Then the machine learning device is configured to perform a machine learning operation according to the input data to obtain output data, use the output data as new input data, and transfer the data to the shared memory for data storage through the transmission circuit. In this embodiment, since the data operation signal carries a type flag bit of the data operation signal and the information of the data to be operated, the transmission circuit may determine a specific type of the data operation signal according to the type flag bit of the data operation signal after receiving the data operation signal, and then perform a corresponding operation according to the information of the data to be operated carried in the data operation signal. In this way, classification of the type flag bits of the data operation signal may quickly locate a corresponding operation, which may simplify the data access logic, improve the data access efficiency, and greatly improve the access speed of the machine learning chip during data access.

In an embodiment, the machine learning device includes at least one machine learning unit, and the data operation signal further includes a data reception flag bit. The returning the input data to the machine learning device includes: determining, by the transmission circuit, a target machine learning unit that receives the input data according to a value of the data reception flag bit, and sending the input data to the target machine learning unit.

In this embodiment, data signal operations performed by the at least one machine learning unit (MLU) included in the machine learning device may share a same data receiving interface. The MLU may transfer signals or data to the transmission circuit through a sending interface and a shared data receiving interface. It should be noted that both the sending interface and the shared data receiving interface may be implemented by hardware circuits, and types of the sending interface and the shared data receiving interface are not limited herein. The data operation signal further includes a data reception flag bit which is used to indicate a target machine learning unit that receives input data. A flagging manner of the data reception flag bit may be, for example, flagging a target machine learning unit that can receive input data as 1. It should be understood that it is only one manner to flag a target machine learning unit that can receive data as 1. In practical applications, the target machine learning unit that can receive data may also be flagged as 0, and a specific flagging manner of the data reception flag bit is not limited herein. Specifically, the transmission circuit determines a target MLU that receives input data according to the value of the data reception flag bit, and sends the input data to the MLU. In this embodiment, according to the flagging of the data reception flag bit carried in the data operation signal, the transmission circuit may determine the target machine learning unit that can receive the input data in the machine learning device. In this way, when receiving data, each machine learning unit in the machine learning device is determined according to the data reception flag bit in the data operation signal, which may simplify the memory access logic in the data access process, improve the data access efficiency, and greatly improve the access speed of the machine learning chip during data access.

Optionally, if a value of the type flag bit of the data operation signal is CAST, the transmission circuit determines the data operation signal to be a broadcast or multicast instruction. Optionally, the type flag bit of the data operation signal is used to indicate an operation type of the data operation signal, and if the type flag bit of the data operation signal is CAST, it is indicated that the data operation signal is a broadcast or multicast instruction. It should be understood that the CAST used herein to represent a broadcast or multicast instruction is only an embodiment. According to actual conditions, the user can redefine the data type flag bit, which is not limited in this embodiment.

Optionally, the type flag bit of the data operation signal may include a first-type flag bit and a second-type flag bit, where the first-type flag bit is used to indicate whether the data operation signal is an I/O instruction, and the second-type flag bit is used to indicate whether the data operation signal is a broadcast or multicast instruction in the I/O instruction. Therefore, if a value of the first-type flag bit is I/O, the transmission circuit determines the data operation signal to be an I/O instruction; if a value of the second-type flag bit is 1, the transmission circuit determines the data operation signal to be a broadcast or multicast instruction in the I/O instruction.

Optionally, the data operation signal includes two types of data flag bits, where the first-type data flag bit indicates a type of the data operation signal, the second-type data flag bit is set in operation information of the data operation signal and indicates a specific sub-type of the data operation signal. Specifically, if a value of the first-type flag bit in the data operation signal is I/O, the transmission circuit determines the data operation signal to be an input/output instruction; and if a value of the second-type flag bit in the data operation signal is 1, the transmission circuit determines the data operation signal to be a broadcast or multicast instruction in the input/output instruction.

Figure 3:
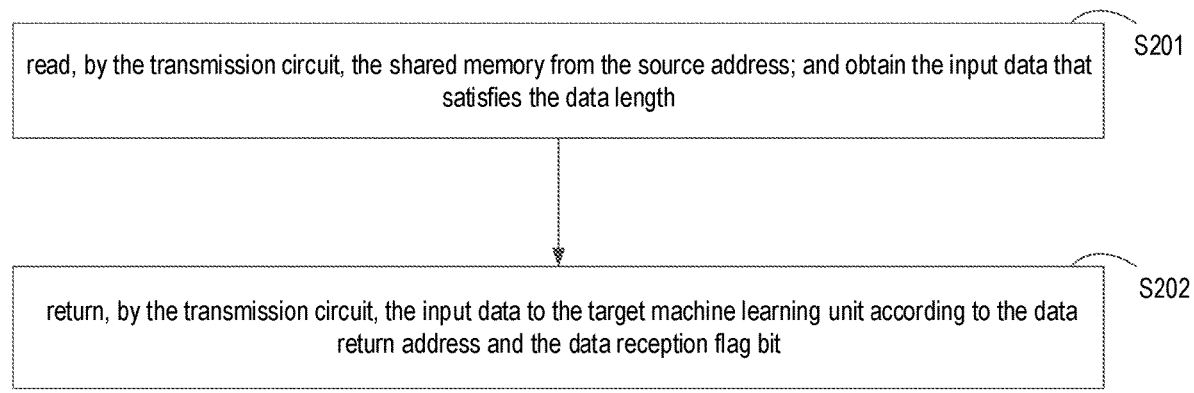
FIG. 3 is a flowchart of a data processing method according to an embodiment.

In an embodiment, as shown in FIG. 3, a data processing method is provided, and this embodiment includes a specific process of a transmission circuit reading data in the shared memory according to data information carried in the data operation signal and returning read data to a target machine learning unit according to the data operation information. As shown in FIG. 3, if the information of data to be operated includes a source address of the data to be operated in the shared memory, a length of the data to be operated, and a data return address after the data is operated, the step S103 includes:

a step S201, reading, by the transmission circuit, the shared memory from the source address, and obtaining the input data that satisfies the data length.

In this embodiment, since the information of the data to be operated of the data operation signal carries the source address of the data to be operated in the memory, the length of the data to be operated, and the data return address of the operated data, the transmission circuit starts to read data from the source address in the shared memory, and reads data that satisfies a length of data to be operated according to a preset rule, where the length of the data to be operated is set by the user according to actual situations, which is not limited herein. The above step of the transmission circuit obtaining input neuron data and data that satisfy the data length specifically includes reading data that satisfies the data length from the shared memory according to a preset rule. The preset rule is set by the user according to actual situations, which is not limited herein. For example, the data may be read one by one starting from the source address until a length of the read data satisfies the data length.

The method further includes a step S202, returning, by the transmission circuit, the input data to the target machine learning unit according to the data return address and the data reception flag bit.

In this step, the transmission circuit returns the obtained input data that satisfies the data length to a data return address in the information of data to be operated, where the data return address in the information of data to be operated may be addresses in a plurality of target machine learning units in the machine learning device. The transmission circuit determines the data to be returned to the target machine learning unit in the machine learning device according to the data reception flag bit carried in the data operation signal.

In the data processing method provided in this embodiment, the transmission circuit starts reading the memory from the source address, obtains input data that satisfies the data length, returns the input data to the target machine learning unit according to the data return address and the data reception flag bit. In this embodiment, the transmission circuit obtaining input data that satisfies the data length specifically includes reading data according to a reading rule instructed by data operation information in the data operation signal, which simplifies the data reading logic of the transmission circuit, improves the data access efficiency, and greatly improves the access speed of the machine learning chip during data access.

Figure 4:
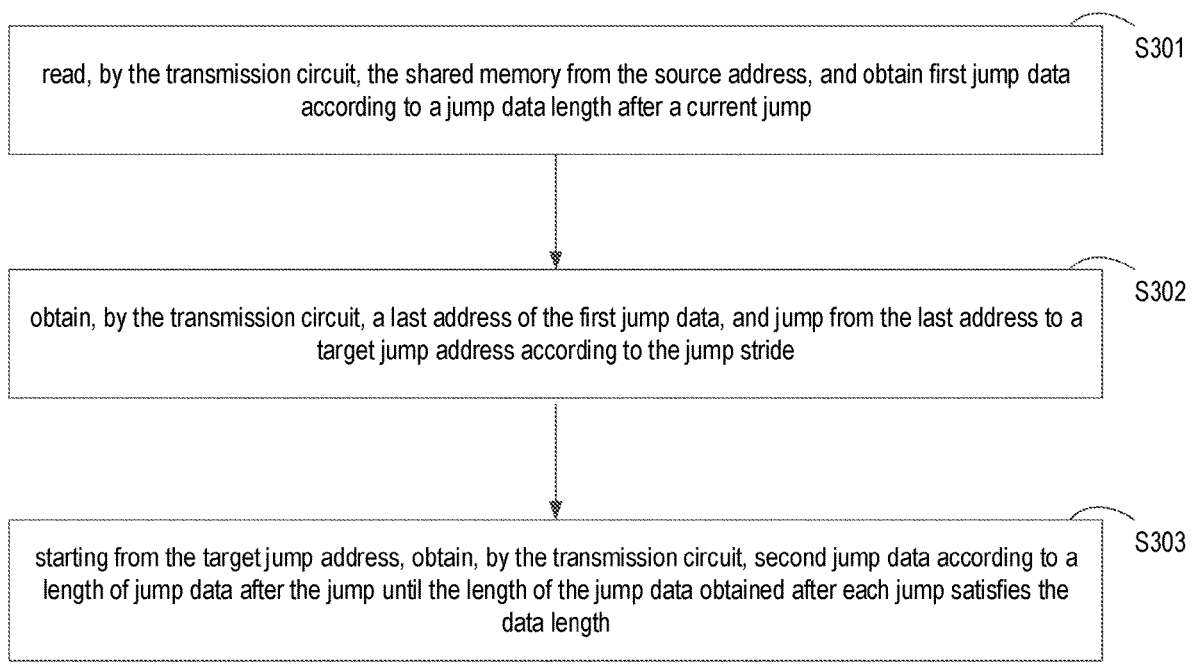
FIG. 4 is a flowchart of a data processing method according to an embodiment.

In an embodiment, FIG. 4 provides a data processing method. On the basis of any of the above embodiments, the operation information in the embodiment further includes jump information, where the jump information includes a jump stride and a data length operated after each jump. The embodiment includes a process of a transmission circuit reading data in the shared memory according to the jump information in the operation information. As shown in FIG. 4, the step S201 includes:

a step S301, reading, by the transmission circuit, the shared memory from the source address, and obtaining first jump data according to a jump data length after a current jump.

In this embodiment, the operation information of the data operation signal includes jump information, where the jump information is used to instruct the transmission circuit to read information of the data to be operated according to the data operation signal and a rule of the jump information. The jump information includes a jump stride and a jump data length operated after each jump, where the jump data length may be a preset data length. Optionally, the jump information includes stride information and/or segment information, where the stride information is used to indicate a stride for each jump of the data operation signal, and the segment information is used to indicate a preset size for each segment of the data operation signal.

Specifically, the transmission circuit starts reading the shared memory from the source address in the information of the data to be operated, and after a current jump, determines data with a read jump data length to be first jump data. The first jump data refers to data obtained after the transmission circuit jumps data with a preset length when reading data, where the preset length is set by the user according to actual situations, which is not limited herein.

The above step S201 further includes a step S302, obtaining, by the transmission circuit, a last address of the first jump data, and jumping from the last address to a target jump address according to the jump stride.

Based on the first jump data read in the step S301, the transmission circuit obtains a last address of the first jump data, and according to a jump stride in the jump information, starts jumping a length of the jump stride from the last address of the first jump data to a target jump address. It can be understood that a length between the last address of the first jump data and the target jump address is a jump stride in the jump information.

The above step S201 further includes a step S303, starting from the target jump address, obtaining, by the transmission circuit, second jump data according to a length of jump data after the jump until the length of the jump data obtained after each jump satisfies the data length.

In this step, during reading data, the transmission circuit starts jumping data with a preset length from the target jump address determined in the above step S302, and determines data obtained after the jump as second jump data. If the length between an address of the second jump data and the source address where the jump starts satisfies a length of data required by the machine learning device, it is indicated that reading the data required by the machine learning device is completed. If the length between an address of the second jump data and the source address where the jump starts does not satisfy a length of data required by the machine learning device, the transmission circuit continues to jump from the last address of the second jump data according to a jump order in the above steps S301 to S303 to read the data until the length between the address of the second jump data and the source address where the jump starts satisfies the length of the data required by the machine learning device, it is indicated that the reading the data required by the machine learning device is completed.

The implementation principles and technical effects of the data processing method provided in this embodiment are similar to those of the foregoing embodiments of the data processing device, which will not be further described herein. In the data processing method provided in this embodiment, the transmission circuit starts reading the shared memory from the source address, obtains the first jump data according to the jump data length obtained after the current jump, starts jumping from the last address of the first jump data to the target jump address according to the jump stride, and then starting from the target jump address, obtains the second jump data according to the jump data length obtained after the jump until the jump data length obtained after each jump satisfies the data length. In this way, when the operation field includes the jump information, the transmission circuit reads data according to the jump rule of the information, which simplifies the data reading logic of the transmission circuit, improves the data access efficiency, and greatly improves the access speed of the machine learning chip during data access.

Figure 5:
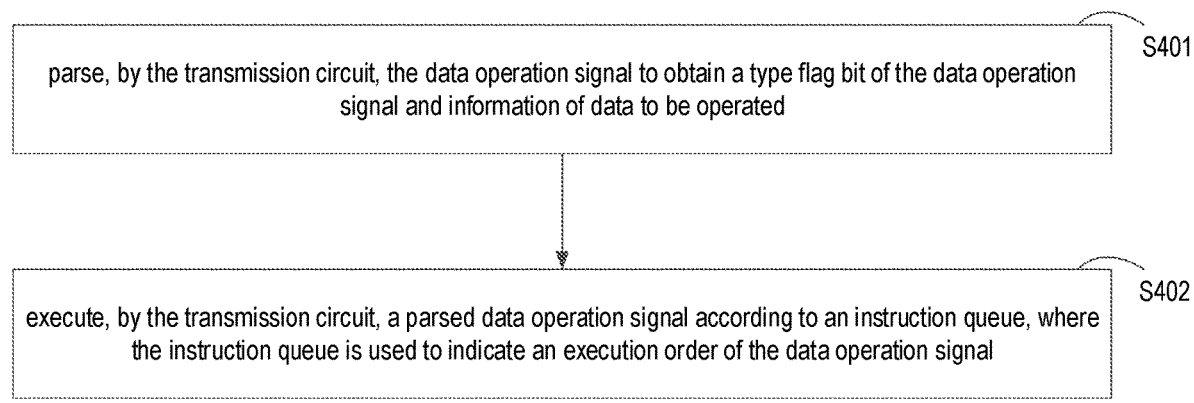
FIG. 5 is a flowchart of a data processing method according to an embodiment.

When the transmission circuit performs an operation according to a received data operation signal, the received data operation signal is an encoding instruction and needs to be first decoded and parsed. Therefore, an embodiment of the present disclosure provides a data processing method. As shown in FIG. 5, the method of the transmission circuit in the data processing device receiving a data operation signal sent by the machine learning device in the data processing device includes:

a step S401, parsing, by the transmission circuit, the data operation signal to obtain a type flag bit of the data operation signal and information of data to be operated.

It should be noted that there are generally a large number of data operation signals in the process of data processing. When the transmission circuit processes one of the data operation signals, other data operation signals need to be stored. Specifically, the transmission circuit parsing the data operation signal includes parsing data information carried in the data operation signal and the type flag bit of the data operation signal. The data operation information may include a length of data to be operated, a target address, an original address, and the like, which is not limited herein.

The method further includes a step S402, executing, by the transmission circuit, a parsed data operation signal according to an instruction queue, where the instruction queue is used to indicate an execution order of the data operation signal.

It should be understood that the data operation signal needs to be executed in order. In the above step S401, the transmission circuit parses the data operation signal to obtain data operation information and a type flag bit, and then the transmission circuit executes the parsed data operation signal according to an instruction queue.

In the data processing method provided in this embodiment, a transmission circuit parses a data operation signal to obtain a type flag bit of the data operation signal and information of data to be operated, and then the transmission circuit executes the parsed data operation signal according to an instruction queue. In this way, before executing the data operation signal, the transmission circuit parses the data operation signal first and then perform the execution in order, which greatly improves the speed of the transmission circuit performing an execution according to the data operation signal.

Figure 6:
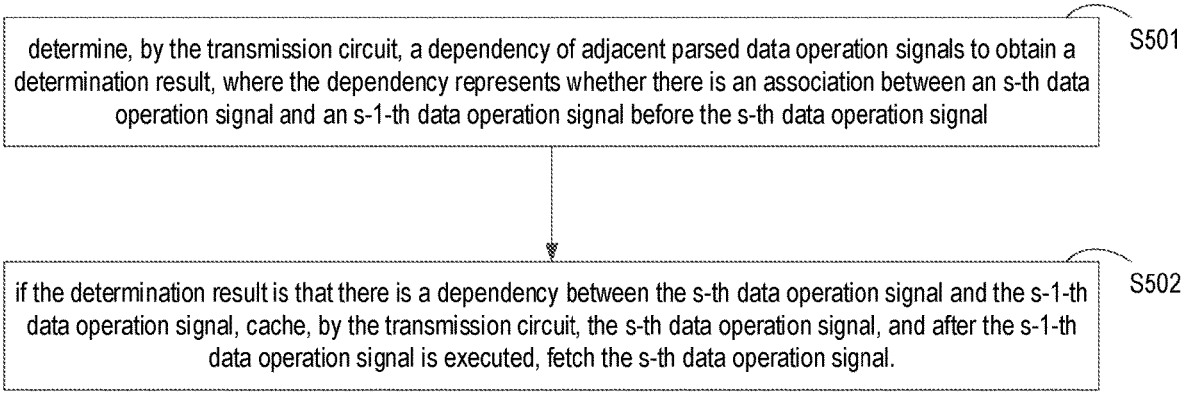
FIG. 6 is a flowchart of a data processing method according to an embodiment.

Since the transmission circuit needs to execute the data operation signals that are related to each other when executing the data operation signals in the sequence in the queue, the embodiment of the present application provides another embodiment, as shown in FIG. 6, in the transmission circuit Before executing the parsed data operation signal according to the instruction queue, the method further includes:

a step S401, determining, by the transmission circuit, a dependency of adjacent parsed data operation signals to obtain a determination result, where the dependency represents whether there is an association between an $s^{th}$ data operation signal and an $s-1^{th}$ data operation signal before the $s^{th}$ data operation signal.

The transmission circuit needs to determine a dependency of adjacent parsed data operation signals, and determine whether there is an association between the two adjacent data operation signals to be processed according to a determination result, where the $s^{th}$ data operation signal represents any signal in the data operation signals instead of a specific signal. The $s-1^{th}$ data operation signal represents a previous signal of the $s^{th}$ data operation signal.

Optionally, an implementation of the transmission circuit determining a dependency of the adjacent parsed data operation signals includes: fetching, by the transmission circuit, a first storage address interval of data required in the $s^{th}$ data operation signal according to the $s^{th}$ data operation signal, fetching a zeroth storage address interval of data required in the $s-1^{th}$ data operation signal according to the $s-1^{th}$ data operation signal, respectively; if the first storage address interval and the zeroth storage address interval have an overlapping area, it is determined by the transmission circuit that there is an association between the $s^{th}$ data operation signal and the $s-1^{th}$ data operation signal; and if the first storage address interval and the zeroth storage address interval do not have an overlapping area, it is determined by the transmission circuit that there is no association between the $s^{th}$ data operation signal and the $s-1^{th}$ data operation signal. Optionally, the transmission circuit determines a dependency of the adjacent parsed data operation signals according to a relationship between the first storage address interval of data required in the $s^{th}$ data operation signal and the zeroth storage address interval of the $s-1^{th}$ data operation signal; the determination manner may be: if the first storage address interval and the zeroth storage address interval do not have an overlapping area, it is determined that there is no dependency between the $s^{th}$ data operation signal and the $s-1^{th}$ data operation signal, and if the first storage address interval and the zeroth storage address interval have an overlapping area, it is determined that there is a dependency between the $s^{th}$ data operation signal and the $s-1^{th}$ data operation signal.

The method further includes a step S402, if the determination result is that there is a dependency between the $s^{th}$ data operation signal and the $s-1^{th}$ data operation signal, caching, by the transmission circuit, the $s^{th}$ data operation signal, and after the $s-1^{th}$ data operation signal is executed, fetching the $s^{th}$ data operation signal.

Based on the dependency of two adjacent data operation signals determined by the transmission circuit in the above steps, the data operation signals are executed in order; if the determination result is that there is a dependency between the $s^{th}$ data operation signal and the $s-1^{th}$ data operation signal, the transmission circuit first caches the $s^{th}$ data operation signal, and after the $s-1^{th}$ data operation signal is executed, fetches the $s^{th}$ data operation signal.

In the data processing method provided in this embodiment, the transmission circuit ensures continuity of the data operation signal by determining an association between two adjacent data operation signals. In this way, orderly preparations in the early stage ensure subsequent operations to be executed smoothly according to the data operation signal, which improves the data access efficiency and greatly improve the access speed of the machine learning chip during data access.

The present disclosure further provides a neural network operation device which includes one or more computation devices mentioned in the present disclosure. The neural network operation device is configured to obtain data to be operated and control information from other processing devices, perform a specified neural network operation, and send an execution result to a peripheral apparatus through an I/O interface. The peripheral apparatus may include a camera, a monitor, a mouse, a keyboard, a network card, a WIFI interface, a server, and the like. When more than one of the above computation devices are included, the computation devices may be interconnected and transfer data to each other through a specific structure. For example, the computation devices may be interconnected and transfer data via a PCIE bus to support neural network operations with a larger scale. In this case, the computation devices may share the same control system, or may have separate control systems. The computation devices may share a memory, or each accelerator may have separate memories. In addition, an interconnection method of the computation devices may be any interconnection topology.

The neural network operation device has good compatibility and may be connected to various types of servers through a PCIE interface.

Figure 7:
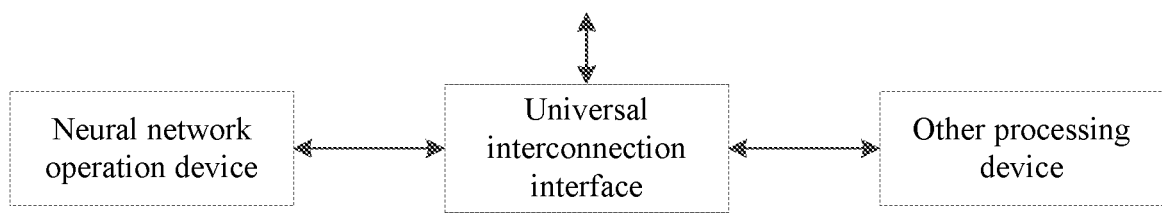
FIG. 7 is a schematic structural diagram of a combined processing device according to an embodiment.

The present disclosure also provides a combined processing device, where the device includes the neural network operation device, a universal interconnection interface, and other processing devices. The neural network operation device interacts with other processing devices to perform operations specified by users. FIG. 7 is a schematic diagram of the combined processing device.

The other processing devices include at least one or more of a general-purpose/special-purpose processors such as a central processing unit (CPU), a graphics processing unit (GPU), a neural network processor, and the like. A count of processors included in the other processing devices is not limited herein. The other processing devices may serve as an interface that connects the neural network operation device to external data and control, including data moving, and may perform the basic control such as starting and stopping the neural network operation device. The other processing devices may also cooperate with the neural network operation device to complete operation tasks.

The universal interconnection interface may be configured to transfer data and control instructions between the neural network operation device and the other processing devices. The neural network operation device may obtain required input data from the other processing devices and write the data in an on-chip storage device of the neural network operation device. The neural network operation device may obtain control instructions from the other processing device, and write the control instructions in an on-chip control cache of the neural network operation device. The neural network operation device may further read data stored in a storage module of the neural network operation device and transfer the data to the other processing devices.

Figure 8:
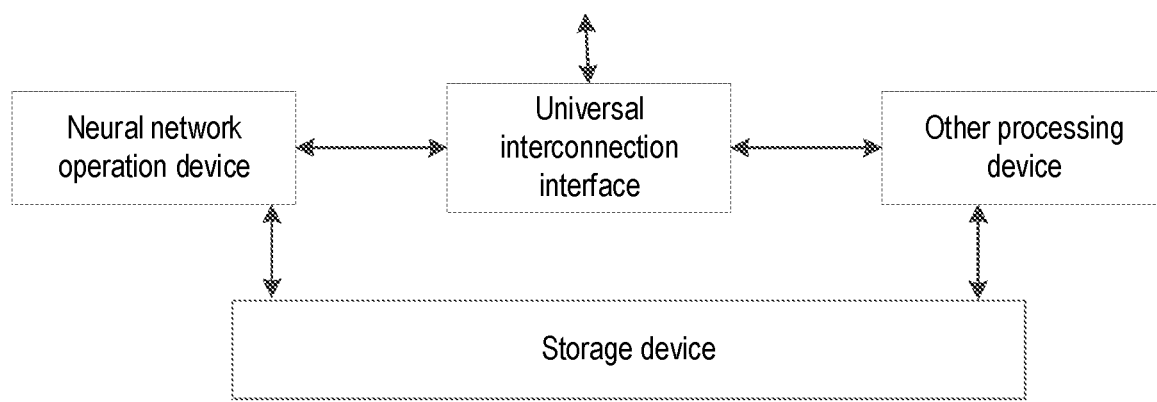
FIG. 8 is a schematic structural diagram of a combined processing device according to another embodiment.

Optionally, as shown in FIG. 8, the structure may further include a storage device, where the storage device is connected to the neural network operation device and the other processing devices respectively, and the storage device is configured to store data of the neural network computation device and the other processing devices. The storage device is configured to store data of the neural network operation device and the other processing devices, and is particularly suitable for a case where data to be operated cannot be completely stored in an internal memory of the neural network operation device or the other processing devices.

The combined processing device may be used as an SOC (System on Chip) of a device such as a mobile phone, a robot, a drone, a video surveillance device, and the like, which may effectively reduce the core area of a control part, increase the processing speed, and reduce the overall power consumption. In this case, a universal interconnection interface of the combined processing device may be connected to some components of the device. The components may include a camera, a monitor, a mouse, a keyboard, a network card, and a WIFI interface.

In some embodiments, the present disclosure provides a chip which includes the above neural network computation device or the combined processing device.

In some embodiments, the present disclosure provides a chip package structure which includes the above chip.

Figure 9:
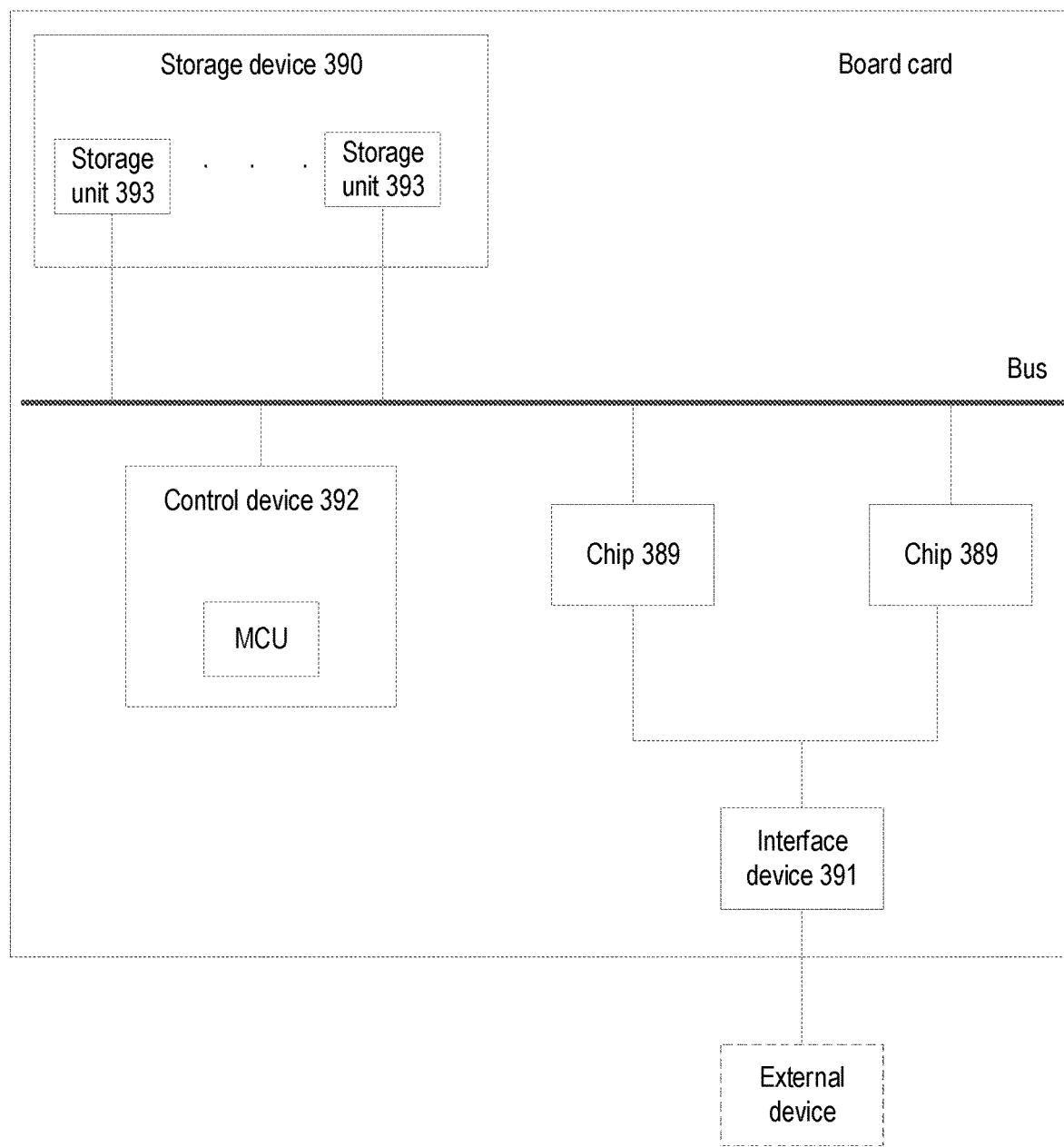
FIG. 9 is a schematic structural diagram of a board card according to an embodiment.

In some embodiments, the present disclosure provides a board card which includes the above chip package structure. FIG. 9 shows a board card which includes the above chip 389 and other supporting components, where the supporting components include and are not limited to: a storage device 390, an interface device 391, and a control device 392;

the storage device 390 is connected to the chip in the chip package structure through a bus for storing data. The storage device may include a plurality of clusters of storage units 393. Each cluster of the storage units is connected to the chip through a bus. It may be understood that each cluster of the storage units may be DDR SDRAMs (Double Data Rate Synchronous Dynamic Random Access Memory).

DDR may double the speed of SDRAM without increasing a clock frequency. DDR allows data to be read on rising and falling edges of a clock pulse. A speed of DDR is twice that of standard SDRAM. In an embodiment, the storage device may include four clusters of the storage units. Each cluster of the storage units may include a plurality of DDR4 particles (chips). In an embodiment, the chip may include four 72-bit DDR4 controllers, where 64 bits in the 72-bit DDR4 controller are used for data transfer and 8 bits are used for ECC verification. It may be understood that when DDR4-31200 particles are used in each cluster of the storage units, a theoretical bandwidth of data transfer may reach 251600 MB/s.

In an embodiment, each cluster of the storage units includes a plurality of DDR SDRAMs arranged in parallel. DDR may transfer data twice in one clock cycle. A controller for controlling the DDR is arranged in the chip to control data transfer and data storage of each storage unit.

The interface device is electrically connected to the chip in the chip package structure. The interface device is configured to implement data transfer between the chip and an external device (such as a server or a computer). For example, in an embodiment, the interface device may be a standard PCIE interface. For example, data to be processed is transferred from the server to the chip through a standard PCIE interface to realize data transfer. Optionally, when a PCIE 3.0×16 interface is used for transfer, a theoretical bandwidth may reach 116000 MB/s. In another embodiment, the interface device may also be other interfaces. A specific representation of the other interfaces is not limited herein, as long as the interface unit can realize a switching function. In addition, a computation result of the chip is still sent back to the external device (such as a server) by the interface device.

The control device is electronically connected to the chip. The control device is configured to monitor a state of the chip. Specifically, the chip and the control device may be electrically connected through an SPI interface. The control device may include a micro controller unit (MCU). For example, the chip may include a plurality of processing chips, processing cores, or processing circuits, and may drive a plurality of loads. Therefore, the chip can be in different working states such as multi-load and light-load. The control device may realize regulation and control of working states of a plurality of processing chips, processing cores and/or processing circuits in the chip.

In some embodiments, the present disclosure provides an electronic device which includes the above board card.

The electronic device may include a data processing device, a robot, a computer, a printer, a scanner, a tablet, a smart terminal, a mobile phone, a traffic recorder, a navigator, a sensor, a webcam, a server, a cloud-based server, a camera, a video camera, a projector, a watch, a headphone, a mobile storage, a wearable device, a vehicle, a household appliance, and/or a medical equipment.

The vehicle may include an airplane, a ship, and/or a car. The household electrical appliance may include a television, an air conditioner, a microwave oven, a refrigerator, an electric rice cooker, a humidifier, a washing machine, an electric lamp, a gas cooker, and a range hood. The medical equipment may include a nuclear magnetic resonance spectrometer, a B-ultrasonic scanner, and/or an electrocardiograph.

It should be understood that identical or similar parts in the above embodiments may be referred to each other, and for contents not described in detail in some embodiments, please refer to the identical or similar contents in other embodiments.

It should be noted that in the descriptions of the present disclosure, the terms "first", "second", etc., are only used for descriptive purposes, and should not be understood as indicating or implying relative importance. In addition, in the description of the present disclosure, unless otherwise specified, the word "plurality" means "at least two".

It should be understood that any process or method description in the flowchart or described in other ways herein represents one or more modules, segments, or parts of codes of executable instructions configured to implement specific logical functions or steps of the process. In addition, the scope of optional implementations of the present disclosure includes additional implementations, and the functions can be implemented in an order not shown or discussed in the present disclosure, or in a substantially simultaneous manner, or in a reverse order according to the functions involved, which should be understood by those skilled in the art to which the embodiments of this present disclosure belong.

It should be understood that each part of the present disclosure can be implemented by hardware, software, firmware, or a combination thereof. In the above implementations, a plurality of steps or methods can be implemented by using software or firmware stored in a memory and executed by a suitable instruction execution system. For example, if hardware is used for implementation, as in another implementation, the steps can be implemented by any one or more of the following technologies known in the art: a discrete logic circuit with a logic gate circuit configured to implement logic functions on data signals, an application-specific integrated circuit with a suitable combinational logic gate circuit, a programmable gate array (PGA), a field-programmable gate array (FPGA), and the like.

Those of ordinary skill in the art can understand that the entire or part of the flow in the methods as stated in the embodiments can be implemented by a program instructing related hardware, wherein the program may be stored in a computer readable storage medium and may include one or more of the methods as stated in the embodiments during execution.

In addition, the functional units in each example of the present application may be integrated into one processing module, or each of the units may exist separately and physically, or two or more units may be integrated into one module. The integrated module above may be implemented in the form of hardware or software function module. When the integrated module is implemented in the form of a software function module and sold or used as an independent product, the module may be stored in a computer-readable storage medium.

The storage medium may be a read-only memory, a disk, a compact disc, etc.

The term "an embodiment", "some embodiments", "example", "specific example", "some examples", or the like referred to herein means that particular features, structures, materials, or characteristics described in conjunction with the embodiment or the example may be contained in at least one embodiment or example of the present disclosure. In the specification, the schematic descriptions of the above terms do not necessarily refer to the same embodiment or example. In addition, the described specific features, structures, materials, or characteristics can be combined in any one or more embodiments or examples in a suitable manner.

Although embodiments of the present disclosure have been shown and described above, it should be understood that the above embodiments are only exemplary and not intended to limit the disclosure. Any changes, modifications, replacements, and variants of the embodiments can be made within the scope of the disclosure.

The invention claimed is:

1. A data processing device for processing machine learning data, comprising a machine learning device, a transmission circuit, and a shared memory, wherein the machine learning device is connected to the transmission circuit, and the transmission circuit is connected to the shared memory;
   the transmission circuit is configured to obtain input data required by the machine learning device from the shared memory according to a data operation signal sent by the machine learning device, and return the input data to the machine learning device; and the data operation signal carries a type flag bit of the data operation signal and information of data to be operated,
   wherein the machine learning device includes at least one machine learning unit, and
   wherein the data operation signal further includes a data reception flag bit which is used to indicate a target machine learning unit that receives the input data.

2. The data processing device of claim 1, wherein the machine learning device is configured to perform a machine learning operation according to the input data to obtain output data.

3. The data processing device of claim 2, wherein the machine learning device is further configured to transfer the output data to the shared memory through the transmission circuit for data storage.

4. The data processing device of claim 1, wherein a value of the type flag bit of the data operation signal includes CAST, which indicates that the data operation signal is a broadcast or a multicast instruction.

5. The data processing device of claim 4, wherein the type flag bit of the data operation signal includes a first-type flag bit and a second-type flag bit, where
   a value of the first-type flag bit includes I/O, which indicates whether the data operation signal is an I/O instruction; and
   the second-type flag bit is used to indicate whether the data operation signal is a broadcast or a multicast instruction in the I/O instruction.

6. The data processing device of claim 5, wherein the information of the data to be operated includes at least one of a source address of the data to be operated in the shared memory, a length of the data to be operated, and a data return address after the data is operated.

7. The data processing device of claim 6, wherein the data operation signal further includes jump information, where the jump information includes a jump stride and a data length operated after each jump.

8. The data processing device of claim 7, wherein the jump information includes stride jump information or segment jump information, wherein
- the stride jump information is used to indicate a stride for each jump of the data operation signal; and
- the segment jump information is used to indicate a preset size for each segment of the data operation signal.

9. The data processing device of claim 8, wherein the data operation signal further includes a function flag bit which is used to indicate a processing operation performed by the transmission circuit on read data.

10. The data processing device of claim 1, wherein the transmission circuit includes:
- an instruction storage unit configured to store the data operation signal;
- an instruction processing unit configured to parse the data operation signal to obtain the type flag bit of the data operation signal and the information of data to be operated; and
- a storage queue unit configured to store an instruction queue, where the instruction queue includes a plurality of the data operation signals to be executed in an order of the instruction queue.

11. The data processing device of claim 10, wherein the transmission circuit further includes a dependency processing unit configured to determine whether there is an association between an sth data operation signal and an s−1th data operation signal before the sth data operation signal, where if there is an association relationship between the sth data operation signal and the s−1th data operation signal, the dependency processing unit is configured to cache the sth data operation signal in the instruction storage unit, and after the s−1th data operation signal is executed, fetch the sth data operation signal from the instruction storage unit and transfer the data to the instruction processing unit; wherein the determining whether there is a association between the sth data operation signals and the s−1th data operation signal includes:
- fetching a first storage address interval of data required in the sth data operation signal according to the sth data operation signal, fetching a zeroth storage address interval of data required in the s−1th data operation signal according to the s−1th data operation signal, respectively; if the first storage address interval and the zeroth storage address interval have an overlapping area, determining that there is an association between the sth data operation signal and the s−1th data operation signal; and if the first storage address interval and the zeroth storage address interval do not have an overlapping area, determining that there is no association between the sth data operation signal and the s−1th data operation signal.

12. A data processing method applied to the data processing device of claim 1, comprising:
- receiving, by a transmission circuit in a data processing device, a data operation signal sent by a machine learning device in the data processing device, where the data operation signal carries a type flag of the data operation signal and information of data to be operated;
- determining, by the transmission circuit, an operation performed on data in a shared memory according to a type flag bit of the data operation signal; performing, by the transmission circuit, the operation on the data to be operated according to the information of the data to be operated to obtain input data required by the machine learning device; and returning, by the transmission circuit, the input data to the machine learning device; and
- performing, by the machine learning device, a machine learning operation according to the input data to obtain output data; using the output data as new input data, and transferring the new input data to the shared memory through the transmission circuit for data storage,
- wherein the machine learning device includes at least one machine learning unit, and the data operation signal further includes a data reception flag bit, where the returning the input data to the machine learning device includes:
- determining, by the transmission circuit, a target machine learning unit that receives the input data according to a value of the data reception flag bit, and sending the input data to the target machine learning unit.

13. The data processing method of claim 12, further comprising:
- if a value of the type flag bit of the data operation signal is CAST, determining, by the transmission circuit, that the data operation signal is a broadcast or a multicast instruction.

14. The data processing method of claim 13, wherein the type flag bit of the data operation signal includes a first-type flag bit and a second-type flag bit, where the first-type flag bit is used to indicate whether the data operation signal is an I/O instruction, and the second-type flag bit is used to indicate whether the data operation signal is a broadcast or a multicast instruction in the I/O instruction, where the data processing method further includes:
- if a value of the first-type data flag bit is I/O, determining, by the transmission circuit, that the data operation signal is an I/O instruction; and
- if a value of the second-type data flag bit is 1, determining, by the transmission circuit, that the data operation signal is a broadcast or a multicast instruction in the I/O instruction.

15. The data processing method of claim 14, wherein the information of the data to be operated includes a source address of the data to be operated in the shared memory, a length of the data to be operated, and a data return address after the data is operated; where the performing the operation on the data to be operated according to the information of the data to be operated to obtain input data required by the machine learning device and returning the input data to the machine learning device includes:
- reading, by the transmission circuit, the shared memory from the source address, and obtaining the input data that satisfies the data length; and
- returning, by the transmission circuit, the input data to the target machine learning unit according to the data return address and the data reception flag bit.

16. The data processing method of claim 15, wherein the data operation signal further includes jump information, where the jump information includes a jump stride and a data length operated after each jump, wherein the transmission circuit reading the shared memory from the source address and obtaining the input data that satisfies the data length includes:
- reading, by the transmission circuit, the shared memory from the source address, and obtaining first jump data according to a jump data length after a current jump;
- obtaining, by the transmission circuit, a last address of the first jump data, and jumping from the last address to a target jump address according to the jump stride; and starting from the target jump address, obtaining, by the transmission circuit, second jump data according to a length of jump data after the jump until the length of the jump data obtained after each jump satisfies the data length.

17. The data processing method of claim 16, wherein the transmission circuit in the data processing device receiving a data operation signal sent by the machine learning device in the data processing device includes:

parsing, by the transmission circuit, the data operation signal to obtain the type flag bit of the data operation signal and the information of data to be operated; and executing, by the transmission circuit, a parsed data operation signal according to an instruction queue, where the instruction queue is used to indicate an execution order of the data operation signal.

* * * * *